May 29, 1962 PAUL-GERHARD ROTHE 3,037,091

WIDE FREQUENCY BAND RECORDING AND REPRODUCING SYSTEM

Filed June 29, 1959

Inventor:
Paul-Gerhard Rothe
By [signature]
Patent Agent 3,037,091

WIDE FREQUENCY BAND RECORDING AND REPRODUCING SYSTEM

Paul-Gerhard Rothe, Ulm (Danube), Germany, assignor to Telefunken G.m.b.H., Berlin, Germany
Filed June 29, 1959, Ser. No. 823,395
Claims priority, application Germany July 8, 1958
5 Claims. (Cl. 179—100.2)

The present invention relates to a system for recording and reproducing a frequency band comprising frequencies approaching zero, employing a recording carrier having a plurality of tracks, particularly, a magnetic carrier.

It has been known in the magnetic recording of very wide frequency bands to divide the frequency band into a plurality of sub-bands and to simultaneously record these sub-bands after suitable frequency transformation on adjacent tracks of one magnetic carrier. Such frequency bands, particularly those used for recording of television signals, contain frequencies approaching zero.

It has also been known that the magnetic recording and reproduction of such low frequencies encounters great difficulties. This is due to the fact that the efficiency of the magnetic reproducing head becomes increasingly lower as the frequency is lowered so that, at very low frequencies, the signal amplitude approaches the amplitude of the noise level. In addition to this, so-called white noise of the amplifier, the shot effect noise and microphonics play a part in the case of tubes.

For the reasons mentioned in the foregoing, it is necessary to subject the low frequencies to special handling prior to the recording on the magnetic carrier, for example, by displacing them into a higher frequency range by means of frequency or amplitude modulation. One approach might be to divide the low and high frequencies from each other by means of frequency-dependent networks, to record them on different tracks and to recombine them in the reproducing unit. In such case, care has to be taken not only to maintain amplitude fidelity but also phase fidelity of the frequency components of the recomposed signal. However, in this method, the very low frequency disturbances, due to the amplifier noise, shot effect and microphonics, re-occur in the high-frequency channel. It is not possible to use simple filter means for noise elimination, due to the required phase fidelity.

It is an object of the present invention to provide simple means for obtaining the necessary amplitude and phase fidelity.

It is another object of the present invention to provide a frequency band divider for separating the low frequencies to be recorded and, after suitable transformation by means of modulation or the like, to record these frequencies separately from the total frequency band on one track of the magnetic recording carrier, while the total frequency band is recorded on another track. For the reproduction of the total frequency band, a similar frequency band divider is provided for separating the low frequencies from the total band recorded on the second track in the same way as during the recording step mentioned above, and wherein the divided low frequency portion is subtracted from the total frequency band to derive from this frequency band divider a remainder frequency band which is then recombined with the low frequencies demodulated from the first track to produce a recombined total frequency band. In other words, identical frequency band dividers are used during the recording and reproducing steps whereby, during reproducing, the low frequency band from the first track is combined with said remainder of the frequency band derived from the divider. In the second track, the total frequency band is recorded on the magnetic tape, and in the first track, the low frequency band is recorded on the tape after modulation with a carrier, as mentioned above. During reproduction, the low frequencies are removed from the recorded total frequency band and the remainder of the frequency band is combined with the low frequency band after demodulation from the first track.

In the application of the present invention, frequency band dividers of various types can be used.

It is a further object of the present invention to provide a novel frequency band divider in the form of a network with separate, predominantly inductive and predominantly capacitive branches, wherein each of these two branches includes an ohmic resistance connected at one of its terminals to a constant voltage source, so that a voltage including the low frequencies can be derived from one of the resistances, and a voltage including the remaining frequencies can be derived from the other resistance. In the application of such a frequency divider to the problem of recording and reproducing of wide frequency bands, one output is used in the recording operation for obtaining the low frequencies to be recorded and the other output is employed during reproducing to obtain the remaining frequency band by recombining with the recorded low frequencies.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 1:
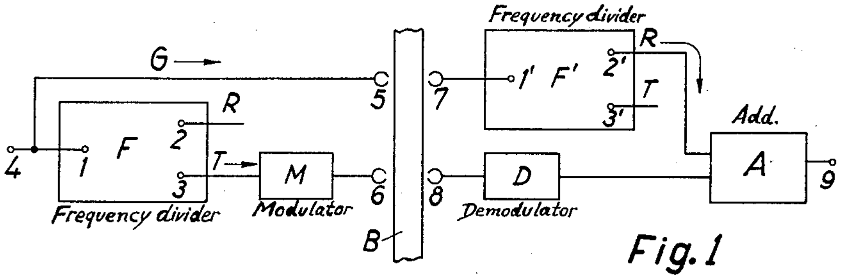
FIGURE 1 illustrates a block diagram of a system for recording and reproducing according to the invention.
Figure 3A:
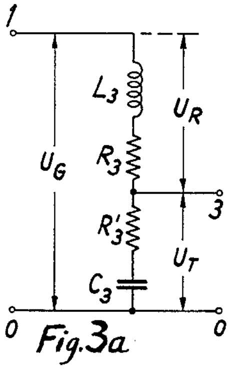
Figure 3B:
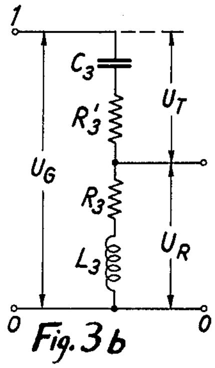
Figure 4:
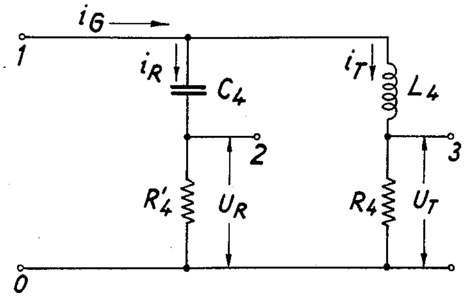

FIGURE 3*a* illustrates a circuit for a frequency band divider for use in a recording unit;

FIGURE 3*b* illustrates a circuit for a frequency band divider for use in a reproducing unit; and FIGURE 4 illustrates a modified circuit for a frequency band divider for use in the system according to FIGURE 1.

F and F′ denote frequency band dividers which may be respectively used in the recording unit shown on the left and in the reproducing unit illustrated on the right of FIGURE 1. The total frequency band G to be recorded is fed on the one hand directly to a magnetic recording head 5 from an input terminal 4 for recording on one track of a magnetic carrier B, for example, a magnetic tape, and is fed on the other hand to a terminal 1 of the frequency band divider F′. The low frequencies T of the total frequency band G are derived from a terminal 3 of the frequency band divider F and are fed to a modulator M, in which they are modulated onto a suitable carrier frequency, for instance, by frequency modulation. The modulation product is recorded on the second track of the magnetic tape by means of a magnetic recording head 6.

During reproduction, the total frequency band recorded by the head 5 is picked up from the magnetic tape by means of a reproducing head 7 and is fed to a terminal 1′ of the frequency band divider F′ which is similar to the first frequency band divider F. The signal recorded by the recording head 6, which signal is modulated and contains the low frequencies, is picked up from the tape by means of a magnetic reproducing head 8 and is fed to a demodulator D in order to recover the low frequencies. In an add circuit A, these low frequencies are combined with the remaining frequency band derived from the terminal 2′ of the frequency bandd ivider F′ to recover the total signal G which is derived from the terminal 9. If it is expected that a phase delay may occur in the low channel, due to the modulator and demodulator, such delay can be compensated by introducing a delay in the other channel by displacing the head 5 (or 7) with respect to the head 6 (or 8) respectively.

Figure 2:
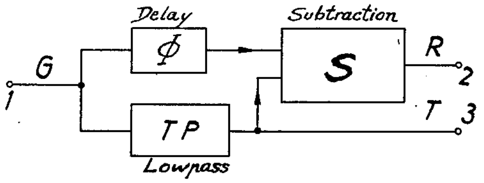
FIGURE 2 illustrates a block diagram of a frequency band divider suitable for use in the system of FIGURE 1.

FIGURE 2 is a circuit diagram showing an example of a frequency band divider which may be used as unit F or F′ in the apparatus illustrated in FIGURE 1. This frequency band divider comprises a simple low-pass filter TP to which the total signal G is fed from the terminal 1 and from which the low frequencies T are derived at the terminal 3. This arrangement is sufficient for the recording unit. The remainder of the frequency band must be recovered at the reproducing unit. For this purpose, a time delay $\phi$ is shunted to, i.e., inserted adjacent, the low-pass filter TP, said delay having the same phase shift as the low-pass filter.

The output of the low-pass filter is subtracted or separated from the output of the delay member $\phi$ in a subtraction or separating circuit S, so that the remainder of the frequency band appears at the terminal 2.

FIGURE 3*a* shows a specific example of a frequency band divider F for the recording unit, while FIGURE 3*b* illustrates a frequency band divider F′ for the reproducing unit. These two dividers are distinguished merely by the location of their terminals 0. Each circuit comprises a predominantly inductive branch with an inductance $L_3$ and a resistance $R_3$ and a predominantly capacitive branch with a capacity $C_3$ and an ohmic resistance $R'_3$. These two branches are connected in series between the terminals 0 and 1, across which the voltage $U_G$ of the total frequency band is applied. A tap 3, as shown in FIGURE 3*a*, is provided between the resistances $R_3$ and $R'_3$, because here the voltage $U_T$ corresponding to the low frequency is derived, said voltage $U_T$ being referred to the terminal 0 connected to the free end of the capacity $C_3$. According to FIGURE 3*b*, the free end of the inductance $L_3$ is connected to the terminal 0, so that the voltage $U_R$ corresponding to the remainder of the frequency band can be derived from the tap 2 between the two resistances $R_3$ and $R'_3$.

FIGURE 4 shows an embodiment of a preferred form of frequency band divider comprising a current divider, said example being indicated in the foregoing. Shunted across the terminals 0 and 1 are two series circuits, i.e., one series circuit comprising a capacity $C_4$ and a resistance $R'_4$, and a series circuit comprising an inductance $L_4$ and a resistance $R_4$ having substantially the same value as the resistance $R'_4$. The total current $i_G$, fed to the terminal 1, is distributed to the two parallel branch circuits in such a manner, that in the inductive branch $L_4$–$R_4$ a current $i_T$, substantially corresponding to the low frequencies, will flow, while in the capacitive branch $C_4$–$R'_4$ a current $i_R$, corresponding to the remainder of the frequency band containing the higher frequencies, will flow. Thus, a voltage $U_T$, corresponding to the low frequencies, can be derived from the terminal 3 and a voltage $U_R$, corresponding to the remainder of the frequency band, can be derived from the resistance $R'_4$ via the terminal 2. Consequently, in this embodiment, the frequency band dividers indicated in FIGURE 1 as blocks F and F′ are identical in the recording and reproducing units.

In place of the simple current dividers with inductive and capacitive branches as shown in FIGURE 4, more complex network may be employed if necessary.

As shown in the foregoing, the invention does not require networks in which the phase shift need be compensated to a great extent, provided both networks used in the recording and reproducing units have the same attenuation and phase shift. This can be obtained in a simple manner by using like components in the two networks, i.e., in the recording and reproducing units.

I claim:

1. A system for recording and reproducing a wide frequency band employing a recording carrier having at least two tracks, said frequency band containing frequencies approaching zero, said system comprising in the recording portion of the system a first frequency band divider for separating from the total band a low frequency sub-band; modulator means to modulate said low frequency sub-band onto a carrier; and separate recording head means recording on a first track and modulated low frequency sub-band and on a second track the entire frequency band; and said system comprising in the reproducing portion thereof a second frequency band divider which is substantially the same as the first frequency band divider, separate reproducing head means for each track, demodulator means connected with the reproducing head associated with the track on which the modulated sub-band is recorded and delivering said low frequency sub-band after demodulation, and said second frequency band divider dividing the entire band from the second track precisely as said first divider divided the entire band, separating means for separating from the entire band the low frequency sub-band from the second frequency divider to form a remainder band which includes the entire band without the low frequency sub-band, and add means for combining said remainder band with the demodulated sub-band.

2. In a system as set forth in claim 1, said frequency dividers comprising a voltage divider network including a first series circuit of an inductance and a resistance comprising an inductive branch connected in series at a common terminal with a second series circuit of a capacity and a resistance comprising a capacitive branch, wherein said low frequency sub-band is derived from said terminal across said capacitive branch, and said remainder band is derived from said common terminal across said inductive branch.

3. In a system as set forth in claim 1, said frequency dividers comprising a current network including a first series circuit of an inductance connected with a first resistance and comprising an inductive branch of the network, and said network including a second series circuit connected in parallel with said first series circuit and including a capacity connected with a second resistance and comprising a capacitive branch of the network, wherein said low frequency sub-band is derived across said first resistance and said remainder band is derived across said second resistance.

4. An arrangement for recording a frequency band which contains frequencies near to zero or down to zero onto a record carrier, comprising in combination: a frequency band divider for separating the low frequencies from the whole frequency band to be recorded; means for modulating the so separated low frequencies onto a carrier signal and for recording this modulated carrier signal onto one track of the record carrier; and means for recording the whole frequency band onto another track of the record carrier.

5. An arrangement for reproducing a frequency band recorded in accordance with claim 4, comprising in combination: means for picking up the low frequencies recorded onto the one track and for demodulating them; means for picking up the whole frequency band recorded onto the other track; a frequency band divider similar to the one used for recording for separating the low frequencies from the picked-up whole frequency band; and means for recombining the whole frequency band except the low frequencies with the low frequencies picked-up from the first-mentioned track.

References Cited in the file of this patent

UNITED STATES PATENTS

| | | |
|---|---|---|
| 2,532,917 | Howell | Dec. 5, 1950 |
| 2,629,784 | Daniels | Feb. 24, 1953 |